United States Patent [19]

Dahlgren

[11] Patent Number: 4,600,487
[45] Date of Patent: Jul. 15, 1986

[54] ELECTRODIALYSIS APPARATUS AND METHOD OF ELECTRODIALYSIS EMPLOYING SAME

[76] Inventor: Donald A. Dahlgren, 3824 W. Kings Ave., Phoenix, Ariz. 85023

[21] Appl. No.: 627,205

[22] Filed: Jul. 2, 1984

[51] Int. Cl.$^4$ ............................................. B01D 13/02
[52] U.S. Cl. ................................ 204/182.4; 204/301; 204/182.6
[58] Field of Search .................... 204/301, 180 P, 151, 204/402, 403, 415, 182.4, 182.5, 182.6; 210/321.2, 650

[56] References Cited

U.S. PATENT DOCUMENTS

| | | | |
|---|---|---|---|
| 2,687,997 | 8/1954 | Marchand | 204/180 P |
| 3,152,062 | 10/1964 | Clusius et al. | 204/180 P |
| 3,227,643 | 1/1966 | Okun et al. | 204/415 |
| 3,801,698 | 4/1974 | Lowrance et al. | 204/180 P |
| 3,821,091 | 6/1974 | Bilal et al. | 204/180 P |
| 4,105,534 | 8/1978 | Beatty | 204/301 |
| 4,152,215 | 5/1979 | Yoshino et al. | 204/301 |
| 4,196,085 | 4/1980 | Saravis | 210/321.2 |
| 4,351,710 | 9/1982 | Jain | 204/180 P |
| 4,361,475 | 11/1982 | Moeglich | 204/180 P |
| 4,388,166 | 6/1983 | Suzuki et al. | 204/415 |

Primary Examiner—Howard S. Williams
Assistant Examiner—B. J. Boggs, Jr.
Attorney, Agent, or Firm—Harry M. Weiss; David G. Rosenbaum

[57] ABSTRACT

An electrodialyzer and method and concentrate made thereby includes a probe for disposition in a colloidal solution contained within a vessel. The probe is longitudinally divided into cation and anion concentrate chambers having a cathode and anode respectively therein. Application of an electromotive force to the cathode and anode causes electromigratory movement of electrolytes through the cation and anion membranes for deriving a concentrate within a solvent contained within the cation and anion concentrate chambers.

10 Claims, 3 Drawing Figures

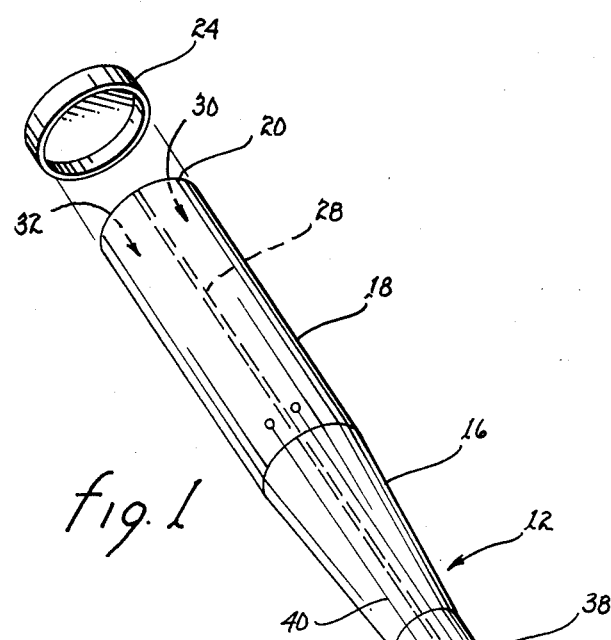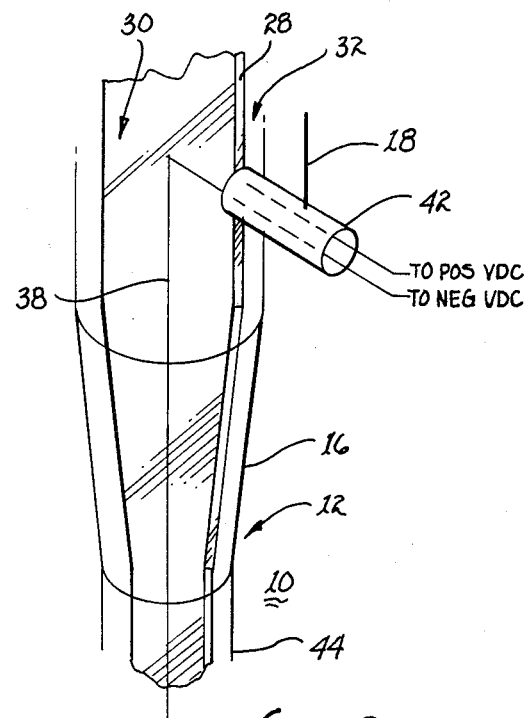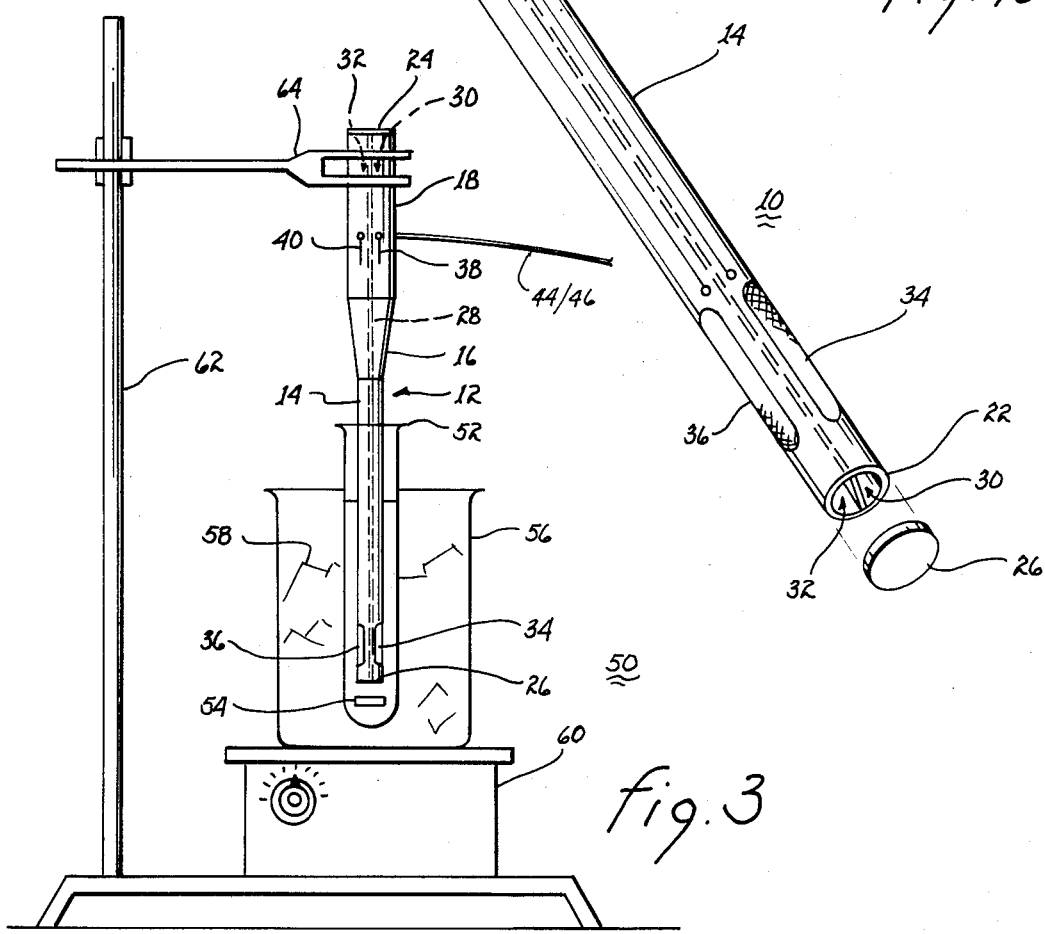

ELECTRODIALYSIS APPARATUS AND METHOD OF ELECTRODIALYSIS EMPLOYING SAME

BACKGROUND OF THE INVENTION

The present invention relates, in general, to the field of electrodializers and methods and concentrates made by a process in accordance therewith. More particularly, the present invention relates to an electrodializer, electrodialysis method and resultant concentrate solution which includes a probe for disposition within a vessel such as a test tube for removal of dissolved salts and other electrolytes from such solution by electrodialysis.

In the past, dissolved salts have normally been removed from solutions by various dialysis techniques, including dialysis tubing. In general, dialysis is the process of separating compounds or materials by the difference in their rates of diffusion through a colloidal semipermeable membrane. Apparati for carrying out dialysis generally comprise two chambers separated by a semipermeable membrane of parchment paper, latex, animal tissue or other colloid. A solution to be dialyzed is placed in one chamber and a pure solvent such as distilled water in the other. Crystalline substances tend to diffuse from the solution through the membrane and into the solvent more rapidly than amorphous substances, colloids or large molecules. Representative devices for carrying out dialysis include: U.S. Pat. No. 4,077,875 issued to Richard D. Kremer on Mar. 7, 1978 for a "Collodion Bag Concentration Accelerator and Sampler" and U.S. Pat. No. 4,196,085 issued to Calvin A. Saravis on Apr. 1, 1980 for a "Dialysis Solution Handling Device".

Likewise, it is also been known to apply an electrical potential to a fluid for purification thereof. See for example U.S. Pat. No. 672,229 issued to Jean A. Lacomme on Apr. 16, 1901 for an "Apparatus for the Purification of Water or Other Hygenic Purposes". Definitionally, however, when the process of dialysis is conducted under the influence of a difference in electrical potential, as from electrodes on opposite sides of a semipermeable membrane, such process is termed electrodialysis.

In electrodialysis, the concentration and/or composition of electrolyte solutions is altered as a result of electromigration through colloidal semi-permeable membranes in contact with the solutions. The most common application of electrodialysis has been the desalinization of saline water by division into more concentrated and dilute portions. By the application of an electric current to a pair of electrodes, fresh water (diluate) and brine (concentrate) is created on opposite sides of the membrane. Representative patents illustrative of this technique include: U.S. Pat. No. 2,788,319 issued to Ralph G. Pearson on Apr. 9, 1957 for an "Ion Exchange Method and Apparatus"; U.S. Pat. No. Re 25,265 reissued to Paul Kollsman on Oct. 16, 1962 for "Reduction of Polarization in Liquid Streams Undergoing Deionization by Electrodialysis"; U.S. Pat. No. 3,657,105 issued to Willem In'T Veld on Apr. 18, 1972 for an "Electrodialysis Apparatus"; U.S. Pat. No. 3,697,410 issued to Allan M. Johnson et al. on Oct. 10, 1972 for an "Electrodialysis Demineralization Apparatus"; and U.S. Pat. No. 4,165,273 issued to Nikoali N. Azarov et al. on Aug. 21, 1979 for a "Device for Producing Deeply Desalted Water". Patents illustrative of a somewhat related electrolysis technique for controlling pH in various solutions include: U.S. Pat. No. 3,065,156 issued to Kennith W. Thompson on Nov. 20, 1962 for an "Electrolytic pH Regulator" and U.S. Pat. No. 4,152,215 issued to Yohzoh Yoshino et al. on May 1, 1979 for an "Apparatus for Controlling Small pH of Culture Solution for a Living Organism".

Other separation processes based on action within an electric field include electrophoresis. This process, related to electrostatic precipitation of dry materials, is based on the fact that particles which are essentially uncharged themselves, but which differ in their polarizability, are subjected to unbalanced forces when placed in non-uniform electric fields. An exemplary apparatus and method is described in U.S. Pat. No. 2,878,178 issued to Milan Bier on Mar. 17, 1959 for "Continuous Free-Boundary Flow Electrophoresis".

Heretofore, while the process of electrodialysis has long been known, conventional removal of dissolved salts from test tube solutions has been carried out by means of dialysis tubing due to the unavailability of satisfactory equipment to carry out the electrodialysis process. However, conventional dialysis is an inherently slow process and somewhat cumbersome to carry out. Moreover, in conventional dialysis valuable materials in solution may be lost such as small molecular weight units. Still further, some valuable material may also be lost due to denaturation because of extended dialysis tubing methods.

SUMMARY OF THE INVENTION

It is therefore an object of the present invention to provide an improved electrodialyzer and method and concentrate made thereby.

It is further an object of the present invention to provide an improved electrodialyzer and method and concentrate made thereby which provides more rapid removal of electrolytes from a solution than conventional dialysis tubing techniques and is readily and conveniently effectuated.

It is still further an object of the present invention to provide an improved electrodialyzer and method and concentrate made thereby which saves valuable materials in solution from loss by saving small molecular weight units normally lost in conventional dialysis techniques.

It is still further an object of the present invention to provide an improved electrodialyzer and method and concentrate made thereby which obviates denaturation or loss of valuable materials due to extended dialysis tubing methods.

It is still further an object of the present invention to provide an improved electrodialyzer and method and concentrate made thereby by which radioactive materials may be safely and more simply dialyzed than by conventional dialysis techniques.

The foregoing and other objects are achieved in the present invention wherein there is provided an electrodialyzer for disposition within a vessel, such as a test tube, containing a colloidal solution. The electrodialyzer comprises a probe having anionic and cationic chambers thereof, the anionic and cationic chambers having a respective negative and positive electrode disposed therein. Anionic and cationic membranes subtend an associated aperture in the probe to the anionic and cationic chambers respectively. The anionic and cationic membranes provide electromigratory communication for electrolytes in the colloidal solution with the anionic and cationic chambers respectively. In operation, diluation of the electrolytes in the colloidal solution may be effectuated with concurrent concentration of the electrolytes in a fluid contained within the anionic and cationic chambers by application of an electromotive force to the negative and positive electrodes from a means for providing the electromotive force.

In accordance with a method of the present invention, an improved electrodialysis method is disclosed and a concentrate made thereby which comprises the steps of providing a probe having anionic and cationic chambers thereof, the anionic and cationic chambers having a respective negative and positive electrode disposed therein. Anionic and cationic membranes respectively subtend an associated aperture to the anionic and cationic chambers of the probe. The probe is disposed within the colloidal solution and an electromotive force is applied to the negative and positive electrodes. In operation, diluation of the electrolytes in the colloidal solution is effectuated with a concomitant concentration of the electrolytes in a fluid contained within the anionic and cationic chambers by electromigratory passage of the electrolytes through the anionic and cationic membranes.

BRIEF DESCRIPTION OF THE DRAWINGS

The above-mentioned and other features and objects of the present invention and the manner of attaining them will become more apparent and the invention itself will be best understood by reference to the following description of an embodiment of the invention taken in conjunction with the accompanying drawings, wherein:

FIG. 1 is an isometric view of an electrodialyzer in accordance with the present invention in the form of a probe having anionic and cationic chambers formed therein by a longitudinal portition shown in phantom;

FIG. 2 is a detailed sectional view of a power cord attachment to the electrodialyzer of FIG. 1 for application of an electromotive force (emf) to a cathode and anode disposed within the cationic and anionic chambers thereof; and FIG. 3 is a side elevational view of an electrodialysis system in accordance with the present invention utilizing the electrodialyzer of FIGS. 1 and 2 in conjunction with a solution contained in a test tube, for example, a biological fluid surrounded by an ice bath held in a beaker.

DESCRIPTION OF A PREFERRED EMBODIMENT

With reference to FIG. 1, an electrodialyzer 10 in accordance with the present invention shown. In the embodiment illustrated, electrodialyzer 10 comprises, in major part, a probe 12 for insertion within a vessel containing a colloidal solution from which electrolytes are to be removed. Probe 12 comprises a generally tubular-shaped member comprising barrel 14 tapered section 16 and reservoir 18. Probe 12 may be constructed of extruded plastic tubing such as polycarbonate or other suitable materials.

Probe 12 presents an upper end 20 and opposite lower end 22. Removable cap 24 circumferentially surrounds and frictionally engages probe 12 at upper end 20 thereof. Sealed cap 26 adjoins probe 12 at lower end 22 thereof and in most applications may be permanently sealed to probe 12.

Longitudinal partition 28 axially bisects probe 12 from upper end 20 to lower end 22. Longitudinal partition 28, which may be likewise constructed of extruded plastic tubing such as polycarbon te, separates the interior of probe 12 into cation concentrate chamber 30 and anion concentrate chamber 32. Disposed within cation concentrate chamber 30 and anion concentrate chamber 32 are cathode 38 and anode 40 respectively. Cathode 38 and anode 40, which may be platinum or other suitable conducting material, extend longitudinally along longitudinal partition 28 from a point near the junction of reservoir 18 with tapered section 16 to a point adjacent cation membrane 34 and anion membrane 36 respectively. Cation membrane 34 and anion membrane 36 subtend apertures into cation concentrate chamber 30 and anion concentrate chamber 32 respectively. Cation membrane 34 and anion membrane 36 subtend respective apertures and may comprise a nylon mesh such as marketed under the trademark "Cerex" and a respective cation or anion coating respectively.

Referring additionally now to FIG. 2, a detailed view of power cord attachment 42 to probe 12 of electrodialyzer 10 is shown. In this illustration, like structure to that above described with respect to FIG. 1 is like numbered and the foregoing description thereof shall suffice herefor. Power cord attachment 42 serves as a point of attachment for negative power supply lead 44 and positive power supply lead 46 to which an electromotive force (emf) may be applied. Negative power supply lead 44 is electrically connected to cathode 38 while positive power supply lead 46 is electrically connected to anode 40. Power cord attachment 42 may comprise a plug or other terminal attachment for application of an electromotive force to cathode 38 and anode 40.

Referring additionally to FIG. 3, an electrodialysis system 50 in accordance with the present invention is shown. As with the preceding illustration, like structure to that above described is like numbered and the foregoing description thereof shall suffice herefore. Electrodialysis system 50 comprises a test tube 52 into which electrodialyzer 10 may be disposed. In the utilization of electrodialysis system 50 shown, test tube 52 includes a stirring bar 54 which may be agitated by magnetic coupling to magnetic stirrer 60. Thus, by means of magnetic stirrer 60 and stirring bar 54, a colloidal solution contained within test tube 52 may be continuously agitated.

Test tube 52 is held within an ice bath 58 contained within beaker 56. Ice bath 58 is of especially utility in the operation of electrodialysis system 50 in conjunction with a biological solution for electrodialysis by means of electrodialyzer 10. As shown, electrodialyzer 10 may be held in position within test tube 52 by means of support strand 62 and adjustable test tube clamp 64.

In operation, electrolytes may be removed from a colloidal solution within test tube 52 by a combination of electrolysis and dialysis. A pure solvent, such as a diluted saline solution, is placed within cation concentrate chamber 30 and anion concentrate chamber 32 at upper end 20 of probe 12. Electrodialyzer 10 may then be placed within a vessel containing a colloidal solution as shown. By application of an emf to negative power supply lead 44 and positive power supply lead 46, electrolytes are caused to migrate from the colloidal solution into cation concentrate 30 and anion concentrate chamber 32. Cations, which are positively charged ions, are those that are deposited, or which tend to be deposited on cathode 38. They travel in the nominal direction of the current. As shown, the potential on cathode 38 is negative. Anions, on the ohter hand, are negatively charged ions or radicals which tend to be deposited on anode 40 which is held at a positive potential. The selective permeability of cation membrane 34 and anion membrane 36 is due to the fact that they are ion-exchange materials. In such materials, either positive or negative ions can easily move within the solid, whereas the ions of opposite charge permeate the membrane. When placed into a solution, cation exchangers exchange freely with positive ions in the solution, but from a dilute solution, practically no mobile negative ions and no positive ions in excess of those exchanged can enter the solid. As a result, cation membrane 34 acts as a barrier for anions. Electric current passes through it by the motion of cations picked up on one face and released at the other. Similarly, anion membrane 36 conducts by migration of negative ions only.

By use of electrodialyzer 10 in an electrodialysis system 50, removal, recovery, and/or concentration of ionic solutes from non-ionic ones may be effectuated. Electrodialyzer 10 may be utilized to remove electrolytes from biological samples such as the removal and concentration of dissolved salts. Other applications might include deashing of food products and fluids, in pharmaceutical applications or decontamination of dilute radioactive water.

What has been provided, therefore, is an improved electrodialyzer and method and concentrate made thereby which provides more rapid removal of electrolytes from a solution than conventional dialysis tubing techniques and is more readily and conveniently effectuated. By use of the present invention, valuable materials in solution may be saved from loss by saving small molecular weight units normally lost in conventional dialysis techniques. The electrodialyzer and method and concentrate made thereby of the present invention obviates denaturation or loss of valuable materials due to extended dialysis tubing methods and is useful in the safe and simple electrodialyzation of radioactive materials which is safer and simpler than conventional dialysis techniques.

While there have been described above the principles of the present invention in conjunction with specific apparatus, it is to be clearly understood that the foregoing description is made only by way of example not as a limitation to the scope of the invention.

We claim:

1. An electrodialysis method for concentrating electrolytes from a colloidal solution comprising the steps of:
   providing a probe having anionic and cationic chambers thereof, said anionic and cationic chambers being separated by an impermeable longitudinal portion in said probe, said anionic and cationic chambers further having a respective negative and positive electrode disposed therein;
   subtending an associated aperture to said anionic and cationic chambers of said probe with anionic and cationic semipermeable membranes respectively;
   disposing said probe within said colloidal solution; and
   applying an electromotive force to said negative and positive electrodes from a means for providing said electromotive force whereby dilution of said electrolytes in said colloidal solution is effectuated with a concurrent concentration of said electrolytes in a solvent contained within said anionic and cationic chambers by electromigratory passage of said electrolytes through said anionic and cationic membranes.

2. The method of claim 1 further comprising the step of:
   stirring said colloidal solution by means of a magnetic stirrer.

3. The method of claim 1, wherein said probe comprises an extruded plastic tube.

4. The method of claim 1, wherein said cationic membrane comprises a cationic coated nylon mesh and said anionic membrane comprises an anionic coated nylon mesh.

5. An electrodialyzer for disposition within a vessel containing a colloidal solution, said electrodialyzer comprising:
   a probe having anionic and cationic chambers thereof, said anionic and cationic chambers being separated by an impermeable longitudinal partition of said probe, said anionic and cationic chambers further having respective negative and positive electrodes disposed therein; and
   anionic and cationic semi-permeable membranes subtending an associated aperture in said probe to said anionic and cationic chambers respectively, said anionic and cationic membranes providing electromigratory communication for electrolytes in said colloidal solution with said anionic and cationic chambers respectively,
   whereby dilution of said electrolytes in said colloidal solution may be effectuated with concurrent concentration of said electrolytes in a solvent contained contained within said anionic and cationic chambers by application of an electromotive force to said negative and positive electrodes from a means for providing said electromotive force.

6. The electrodialyzer of claim 5 wherein said probe comprises an extruded plastic tube.

7. The electrodialyzer of claim 6 wherein said extruded plastic tube is polycarbonate.

8. The electrodialyzer of claim 5, wherein said cationic membrane comprises a cationic coated nylon mesh and said anionic membrane comprises an anionic coated nylon mesh.

9. The electrodialyzer of claim 8 wherein said nylon mesh is "CEREX".

10. The electrodialyzer of claim 5, wherein said negative and positive electrodes are platinum.

* * * * *